United States Patent Office 3,106,559
Patented Oct. 8, 1963

3,106,559
N-SUBSTITUTED CYCLOHEPTA(b)-PYRROL-8-ONES
Genshun Sunagawa and Yasunobu Sato, % Shinagawa Factory, Sankyo Company, Limited, 888 1-chome, Nishishinagawa, Shinagawa-ku, Tokyo, Japan
No Drawing. Filed Mar. 27, 1961, Ser. No. 98,307
Claims priority, application Japan Mar. 31, 1960
4 Claims. (Cl. 260—268)

This invention relates to cyclohepta[b]pyrrol-8(1H)-one derivatives and process for preparing thereof. More particularly, it relates to new cyclohepta[b]pyrrol-8(1H)-one derivatives having the general formula:

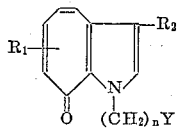
(I)

wherein $R_1$ is a member selected from the group consisting hydrogen and halogen atoms, $R_2$ is a member selected from the group consisting of hydrogen atom, lower alkyl and phenyl radicals, Y is a member selected from the group consisting of di-lower alkyl amino radicals such as dimethylamino or diethylamino radical, 4-methyl-1-piperazinyl and ethoxycarbonyl radicals, and $n$ is an integral number from 1 to 5, and process for preparing thereof. The term "lower alkyl radical" is to be understood as representing alkyl radical having from 1 to 3 carbon atoms.

The cyclohepta[b]pyrrol-8(1H)-one derivatives having the general formula as above (I), particularly 1-(3-dimethylaminopropyl)-3-phenyl-8H-cyclohepta[b]pyrrol-8-one, are useful compounds possessing activities such as loss of conditioned avoidance behavior, potentiation of thiopental anesthesia, inhibition of central nervous system such as induction of slow waves in the spontaneous cortical EEG. Particularly, they are effective in inducing hypotension of very long duration even if administered in a small amount.

It is an object of this invention to provide novel group of compounds of therapeutic use as described above. It is an another object of this invention to provide process for preparing said compounds. Other objects of this invention will be apparent hereinafter.

According to this invention, compounds having above the general Formula I are prepared by reacting a compound having the general formula:

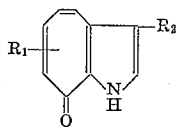
(II)

wherein $R_1$ and $R_2$ have the same meaning as above with a compound having the general formula:

$$X(CH_2)_nY \quad (III)$$

wherein X is halogen atom and Y and $n$ have the same meaning as above, in inert solvents such as toluene, benzene or ligroin in presence of an alkali metal amide such as sodium or potassium amide, alkali metal hydride such as sodium or potassium hydride, or an alkali metal alkoxide such as potassium tertiary butoxide. The reaction is effected by heating the reaction mixture under reflux for a period from about 7 to 20 hours.

In carrying out the process according to the present invention, the reaction is preferably effected by the following procedures: Initially, a mixture of the compound having the general Formula II and the alkali metal amide, hydride or alkoxide in the inert solvent is heated under reflux for about 3–5 hours, followed by cooling to room temperature. To the cooled reaction mixture is added the compound having the general Formula III and the resulting mixture is heated under reflux for about 7–15 hours. After completion of the reaction, the reaction product may be separated from the reaction mixture by conventional methods. For example, the reaction mixture after completion of the reaction is cooled to room temperature, subjected to filtration, the filtrate evaporated to dryness and the residue recrystallized from a solvent such as alcohols. Alternatively, the reaction mixture is cooled to room temperature, subjected to filtration, the filtrate is concentrated to a small volume and the concentrate is subjected to chromatographic treatment to isolate desired product. On chromatographic treatment, the concentrate is poured onto alumina column and eluted with a solvent such as benzene or toluene. The first eluate is shaken with aqueous hydrochloric acid, the aqueous hydrochloric acid layer separated, concentrated to dryness and the residue recrystallized from a solvent such as ethanol.

The below-described data on pharmacological testings are given to make understanding of utility of the products of this invention having general Formula I.

The compounds illustrated in the experiments are as follows: 1-(3-dimethylaminopropyl)-3-methyl-8H-cyclohepta[b]pyrrol-8-one dihydrochloride (called compound A hereinbelow); 1-[3-(4-methyl-1-piperazino)propyl]-3-methyl-8H-cyclohepta[b]pyrrol-8-one dimaleate (called compound B hereinbelow); 1-(3-dimethylaminopropyl)-3-phenyl-8H-cyclohepta[b]pyrrol-8-one dihydrochloride (called compound C hereinbelow); 1-[3-(4-methyl-1-piperazino)propyl]-3-phenyl-8H-cyclohepta[b]pyrrol-8-one dimaleate (called compound D hereinbelow).

$LD_{50}$ of compounds A, B, C and D in male mice by intravenous administration calculated according to Litchfield-Wilcoxon's method were respectively 42.9, 51.9, 50.7 and 34.6 mg. per kg. bodyweight.

Actions of the test compounds on blood-pressure in urethane-anesthetized rabbits and pentobarbital-anesthetized cats are shown in Tables I and II.

TABLE I

[Actions of compounds A, B, C and D by intravenous administration at a dose of 1 mg. per kg. bodyweight on blood pressure of rabbits]

| Test material | Blood pressure | |
|---|---|---|
| | Degree of reduction, mm. Hg | Duration, min. |
| Compd. A | 26 | 5–10 |
| Compd. B | 48 | 10–20 |
| Compd. C | 30 | 120 |
| Compd. D | 16 | ca. 10 |

TABLE II

[Hypotensive actions of compounds A, B, C and D by intravenous administration to cats]

| Test material | Dose, mg./kg. bodyweight | Action |
|---|---|---|
| Compd. A | 0.5 | Reduction by about 7–8 mm. Hg; recovered within few min. |
| Compd. B | 0.5 | Reduction by about 5–6 mm. Hg; immediately recovered. |
| Compd. C | 0.1–1 | Reduction by about 14–44 mm. Hg; lasted for 10 min. to 5–6 hrs. |
| Compd. D | 0.5 | Reduction by about 19–20 mm. Hg; recovered within few min. |

The following examples will further illustrate how our said invention may be carried out in practice, but the invention is not restricted to these examples.

EXAMPLE 1

1-Ethoxycarbonylmethyl-3-Methyl-8H-Cyclohepta[b] Pyrrol-8-One

A suspension of 240 mg. of 3-methyl-8H-cyclohepta[b]pyrrol-8-one and 60 mg. of sodium amide in 8 cc. of toluene is heated under reflux for 3.5 hours to form the sodium salt. To the resulting mixture is added 250 mg. of ethyl bromoacetate, followed by heating under reflux for 14 hours. The inorganic salt is then separated by filtration, the filtrate is concentrated in vacuo and the residue recrystallized from 50% aqueous ethanol to obtain yellowish brown needles melting at 137–138° C. U.V. spectrum of the product has the following absorption maxima:

$\lambda_{max.}^{EtOH}$ 232 m$\mu$ (log $\epsilon$ 4.37); 235.2 (4.40); 238 (4.37); 242.5 (4.28); 2.85 (4.34); 310 (3.89) (shoulder); 366 (3.63); 382 (3.58)

*Analysis.*—Calcd. for $C_{14}H_{15}N_3O$: C, 68.55; H, 6.16; N, 5.71. Found: C, 68.84; H, 6.23; N, 5.77.

EXAMPLE 2

1-(2-Diethylaminoethyl)-3-Methyl-8H-Cyclohepta[b] Pyrrol-8-One Dihydrochloride A suspension of 240 mg. of 3-methyl-8H-cyclohepta[b]pyrrol-8-one and 60 mg. of sodium amide in 15 cc. of toluene is heated under reflux for 4.5 hours. To the resulting mixture is added 210 mg. of diethylaminoethyl chloride, followed by heating under reflux for 7 hours. The reaction mixture is washed with water and the toluene layer separated and concentrated to dryness in vacuo. The residual oil is dissolved in a small amount of benzene and chromatographed on alumina. The first eluate as much as 20 cc. is taken and extracted with 10% aqueous hydrochloric acid. The hydrochloric acid layer is concentrated in vacuo and the residue recrystallized from ethanol to obtain yellow needles melting at 158–160° C. (with decompositon). It is very hygroscopic and soluble readily in water and considerably in methanol and ethanol.

*Analysis.*—Calcd. for $C_{16}H_{24}N_2OCl_2$: N, 8.46. Found: N, 8.52.

EXAMPLE 3

1-(3-Dimethylaminopropyl)-3-Phenyl-8H-Cyclohepta[b] Pyrrol-8-One Dihydrochloride 3-phenyl-8H-cyclohepta[b]pyrrol-8-one, 330 mg. and sodium hydride, 40 mg., are subjected to the reaction in the same way as in Example 2, followed by treatment with 250 mg. of dimethylaminopropyl chloride. The subsequent procedures are same as in Example 2. Recrystallization from ethanol gives yellow needles melting at 175–177° C. (with decompositon). U.V. spectrum of the product has the following absorption maxima:

$\lambda_{max.}^{EtOH}$ 230 m$\mu$ (log $\epsilon$ 4.40); 244 (4.34); 290 (4.33); 364 (3.60); 382 (3.55)

*Analysis.*—Calcd. for $C_{20}H_{24}N_2OCl_2$: C, 63.32; H, 6.38; N, 7.38; Cl, 18.69. Found: C, 63.25; H, 6.35; N, 7.22; Cl, 18.43.

EXAMPLE 4

1-[3-(4-Methyl-1-Piperazinyl)Propyl]-3-Methyl-8H-Cyclohepta[b]Pyrrol-8-One Dimaleate 240 mg. of 3-methyl-8H-cyclohepta[b]pyrrol-8-one is converted to the sodium salt in the same way as in Example 2. 270 mg. of 3-(4-methyl-1-piperazinyl)propyl chloride is then added and the mixture is treated in the same way as in Example 2. To the first eluate from the alumina-column chromatogram is added dropwise an alcoholic solution of maleic acid to precipitate the maleate, which is recrystallized from ethanol to give pale yellow needles melting at 185–186° C. It is soluble readily in water and sparingly in benzene and ether.

*Analysis.*—Calcd. for $C_{26}H_{33}N_3O_9$: C, 58.75; H, 6.26; N, 7.91. Found: C, 58,57; H, 6.45; N, 8.19.

EXAMPLE 5

1-[3-(4-Methyl-1-piperazinyl)propyl]-3-Phenyl-8H-Cyclohepta[b]Pyrrol-8-One Dimaleate A mixture of 330 mg. of 3-phenyl-8H-cyclohepta[b]pyrrol-8-one, 59 mg. of metallic potassium, 110 mg. of tertiary butanol and 15 cc. of toluene is heated under reflux with stirring for 4.5 hours. After cooled to room temperature 270 mg. of 3-(4-methyl-1-piperazinyl)propyl chloride is added to the resulting mixture, followed by heating under reflux with stirring for 10 hours. The subsequent procedures are same as in Example 4. Recrystallization of the maleate from aqueous ethanol gives pale yellow needles melting at 208–209° C. (with decomposition), which gives negative ferric chloride reaction.

*Analysis.*—Calcd. for $C_{31}H_{35}N_3O_9$: C, 62.72; H, 5.94; N, 7.08. Found: C, 62.54; H, 5.80; N, 7.45.

EXAMPLE 6

1-[3-(4-Methyl-1-Piperazinyl)propyl]-3-Methyl-7-bromo-8H-Cyclohepta[b]Pyrrol-8-One Dimaleate A suspension of 238 mg. of 3-methyl-7-bromo-8H-cyclohepta[b]pyrrol-8-one and 40 mg. of sodium amide in 20 cc. of toluene is heated under reflux for 4.5 hours to form the sodium salt. To the resulting mixture is added 185 mg. of 3-(4-methyl-1-piperazinyl)propyl chloride, followed by heating under reflux for 10 hours. The subsequent procedures are same as in Example 4. Recrystallization from aqueous ethanol gives pale yellow needles melting at 199–200° C. (with decomposition).

*Analysis.*—Calcd. for $C_{26}H_{32}N_3O_9Br$: C, 51.15; H, 5.28; N, 6.88. Found: C, 51.00; H, 5.12; N, 7.05.

What we claim is:

1. 1-(3-dimethylaminopropyl)-3-phenyl-8H-cyclohepta[b]pyrrol-8-one.

2. A compound having the formula:

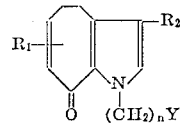

wherein $R_1$ is a member selected from the group consisting of hydrogen and halogen, $R_2$ is a member selected from the group consisting of hydrogen, alkyl of from 1 to 3 carbon atoms and phenyl, Y is a member selected from the group consisting of dimethylamino and diethylamino and $n$ is an integer from 1 to 5.

3. A compound having the formula:

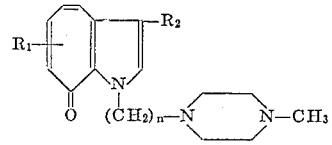

wherein $R_1$ is a member selected from the group consisting of hydrogen and halogen, $R_2$ is a member selected from the group consisting of hydrogen, alkyl of from 1 to 3 carbon atoms and phenyl, and $n$ is an integer from 1 to 5.

4. A compound having the formula:
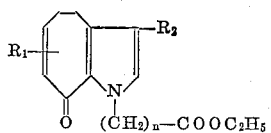
wherein $R_1$ is a member selected from the group consisting of hydrogen and halogen, $R_2$ is a member selected from the group consisting of hydrogen, alkyl of from 1 to 3 carbon atoms and phenyl, and $n$ is an integer from 1 to 5.
References Cited in the file of this patent
UNITED STATES PATENTS
2,985,654    Sherlock et al. _____ May 23, 1961